Sept. 15, 1936.    J. KREMER    2,054,756
BAKERY PRODUCT
Filed Oct. 8, 1931
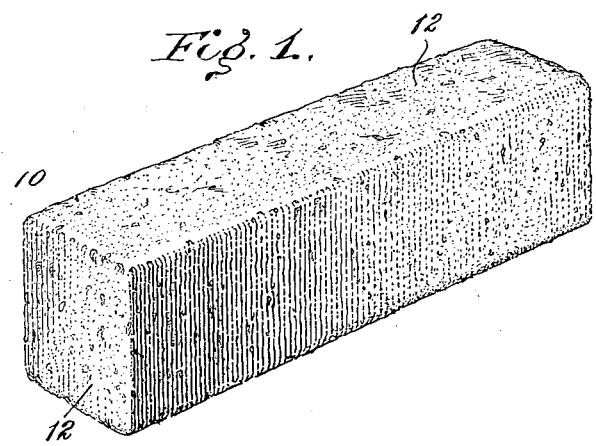
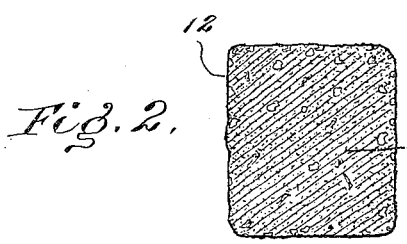
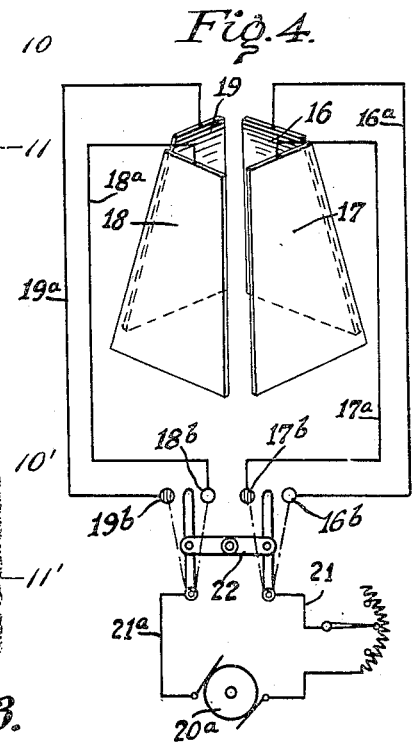
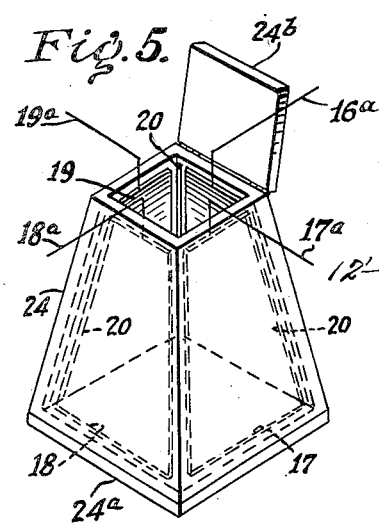
INVENTOR
John Kremer
BY Conrad A. Dieterich
his ATTORNEY Patented Sept. 15, 1936

2,054,756

UNITED STATES PATENT OFFICE 2,054,756

BAKERY PRODUCT

John Kremer, Southport, Conn.

Application October 8, 1931, Serial No. 567,559

2 Claims. (Cl. 99—90)

My invention relates to improvements in bakery products, and the same has for its object to provide a novel dough product which may be produced in minimum time and at comparatively small cost in labor and material.

Further, the invention has for its object to provide a dough product such as bread, cake and similar articles of food but without the usual crust or rind present on bread, cake or other article when the same is produced by the common or usual baking process in heated ovens or the like.

Further, said invention has for its object to produce a finished dough product which, upon completion of the baking operation, possesses the general characteristics and qualities of oven baked bread, cake, or other like article, and whose entire mass is of uniform softness, character or texture, and uniformly baked to any desired extent, and free of the usual crust or rind present in bread and cake produced by the hot oven baking methods commonly used.

Further, said invention has for its object to provide a baked dough product of the character specified resulting from the subjecting of a mass of dough which may be previously prepared in the usual manner, to the direct action of electric energy or current or electro-magnetic waves passing through said mass whereby the same is simultaneously and uniformly heated due to the resistance of the dough mass to the electric energy or current, or to the action of electro-magnetic waves.

Further, said invention has for its object to provide a baked dough product of the character specified, which is free of the usual crust or rind, which is substantially uniform in texture and baking, and which can be completely baked and fit for human consumption in comparatively few minutes.

Other objects will in part be obvious, and in part be pointed out hereinafter.

To the attainment of the aforesaid objects and ends my invention consists in the novel product or article hereinafter more fully described, and then pointed out in the claims.

In the accompanying drawing—

Figure 1 is a perspective view showing a dough product in the form of a loaf of bread produced according to, and embodying my said invention;

Fig. 2 is a cross-sectional view thereof;

Fig. 3 is a cross-sectional view showing the character and texture of a modified form of baked product;

Fig. 4 is a diagrammatic view showing the essential parts of an apparatus for carrying out the process of producing my novel form of dough product, and Fig. 5 is a perspective view showing one form of container or frame used in carrying out my invention.

In the drawing I have shown at Figs. 1 and 2, the invention as embodied in a loaf of bread, 10 comprising the interior portion 11 and an outer surface 12 in the form of a thin film or skin which has not the hardness, appearance, characteristics or other qualities of a crust or rind, such as is commonly found in bread produced by ordinary baking methods in which the previously prepared dough is placed in suitable pans or containers, and then introduced into a heated chamber or oven and there subjected to the indirect action of heat to bake the same to the desired extent. The bread, cake or other dough product, as the case may be, may consist of the usual ingredients such as flour, milk, fat, water, salt, and a suitable fermenting or leavening medium such for example as yeast, or baking powder, in the case of bread, and may also include eggs, flavoring or fruits, spices, etc., in the case of cake. These ingredients may be preliminarily prepared and treated in the same manner as for oven baking as heretofore practiced. To produce my novel product the previously prepared dough mass is placed into a suitable receptacle to hold the same while it is being subjected to the electric energy, current, or electro-magnetic waves. In my co-pending application Serial No. 354,467, filed April 12, 1929, which resulted in Letters Patent No. 2,023,478, dated December 10, 1935. I have shown and described an apparatus and method whereby the desired result may be obtained by subjecting the dough mass to the direct action of electric energy or current for a period of time ranging from about three to ten or fifteen minutes, according to the character and amount of dough to be treated. In the making of cake and other products the time required for baking the same may range from about fifteen minutes to thirty minutes, light cake requiring but a short period of time to fully complete the baking operation, while heavier, richer cake such as pound cake, fruit cake and fruit puddings which require from one to three hours when baked in the usual manner in heated ovens, only require from about five minutes to thirty minutes to completely bake the same.

In said diagram 16, 17, 18, and 19, respectively, represent four vertically arranged plates of uniform size made of aluminum, carbon, or other suitable conducting material, and with the edges separated and preferably insulated from each other, by relatively thin members or baffles 20 formed of glass, mica, paper, or other suitable insulating material and disposed angularly between the adjacent edges of said electrodes. The said members or baffles 20 are maintained in position by grooves provided in the inner walls or sides of the container or frame 24, and serve further to direct the current along certain lines of flow and to reduce the current density at the electrodes. From each plate extends a conductor 16a, 17a, 18a, and 19a, whose outer ends are connected to contacts 16b, 17b, 18b, and 19b. An alternating current or other generator 20a has one terminal 21 connected to one end of a movable switch or circuit closing device 22, adapted to be actuated by any suitable means, and its other terminal 21a also connected to the switch or circuit closing device 22.

In order to make the bread the mass of dough is disposed within a frame or container 24, composed of refractory or insulating material or of any other suitable material lined with insulating material. The said frame or container may be open at its top and bottom, and may be provided with a hinged base and cover portions 24a, 24b, respectively. The frame or container is preferably formed with upwardly tapering sides in order to facilitate the ready withdrawal of the finished product from the bottom of the frame or container.

The plates 16, 17, 18, 19 are disposed within the frame or container in separated relation against the inner walls or sides thereof. In order to improve the contact between the dough and the inner sides of the plates 16, 17, 18 and 19, the latter, for example may be coated or treated with a mixture of fatty matter and salt water, or with any other suitable medium such as a paste consisting of vinegar or other conducting substance mixed with sugar, starch or other appropriate substance. By covering the inner surfaces of the plates 16, 17, 18 and 19 with the fatty solution containing salt two objects are accomplished, viz: (a) the dough or baked product is protected against staining or contamination from the electrodes or products of electrolysis, and (b) the bread or other product is prevented from adhering to the plates, and thus rendered more readily removable therefrom.

A current of high voltage for quick baking, (lower for slow baking,) is caused to pass, for example, from the plate 16 to the plate 18 by way of contacts 16b and 18b, and conductors 16a and 18a, and thence after a brief interval the circuit closing device is actuated, and the current caused to flow from the generator 20a by way of the conductors 21 and 21a to the switch or circuit closing device 22 to the contacts 17b and 19b, conductors 17a and 19a, and caused to pass through the dough from the plate 17 to the plate 19. Variation in line of flow or shift of axis of the current is caused by shifting the switch 22, and the variation in line of flow of current is continued during the entire period of time that the bread is subjected thereto. To insure uniform baking each voltage should be proportional to distance between the electrodes.

It is to be noted that the bread or cake embodying my invention differs from the oven baked product in that the same is produced without the customary browned crust or rind. When bread, cake or the like is baked in the ordinary oven the outside of the mass first becomes baked and in hardening forms the usual browned crust or rind which varies in thickness and hardness according to the intensity of the heat of the oven, and the length of time the product is subjected to such heat. The formation and presence of such crust or rind makes it somewhat more difficult for the oven heat to penetrate the interior of the dough mass. Owing to the fact that the heat must enter the mass from without there results a structure which is not of uniform texture or quality throughout. According to my invention the baking is rendered essentially uniform and simultaneous throughout the mass, and the texture of the bread or cake likewise uniform throughout, since the entire dough mass is heated from within as distinguished from without, as is the case when the same is subjected to oven baking in the customary manner. A further and unusual result is obtained in that the product may be completely baked without the formation of the usual hardened or browned crust or rind. When the baking action is performed by the action of electric current or energy traversing the mass as set forth in my co-pending application, above specified, the dough mass is heated and baked wholly by the internal resistance of the mass to the passage of the electric energy or current through the same, thus causing all of the parts of the mass to be simultaneously and uniformly treated, and yielding a light, porous, wholesome product.

Fig. 3 illustrates a modified form of product in which the baked loaf 10' is substantially devoid of any skin or film such as shown in Figs. 1 and 2. In this modification the outer surface 12' of the baked loaf is substantially the same as the interior 11' thereof, that is to say, its outer surface presents about the same appearance as if a section were cut from the interior of the loaf.

It will thus be noted that bread produced according to my invention being free from the customary crust is particularly adapted for use in making sandwiches and toast and, therefore, does not require trimming as does the bread as commonly baked in heated ovens.

It is to be noted that while I have described my product as being produced by the action of the electric energy or current passing through the mass, that the invention is not limited to an article resulting exclusively from said process, but may include a product which is baked by the internal heating of the mass whether due to its resistance to the passage of electric current or not, such, for example, as the heating of the mass by electro-magnetic waves, or the action of a changing electric field.

The term "light and porous" as used in the within specification and claims is intended to designate bread, cake or analogous dough products which have been baked to the degree necessary to render the same severally wholesome and edible, i. e. well baked or well done.

Having thus described my said invention, what I claim and desire to secure by Letters Patent is:

1. A light, porous, baked dough product formed substantially of uniform texture without crust, and obtained by the generation of heat within the dough of an intensity sufficient to effect the conversion.

2. A light, porous, baked dough product formed substantially of uniform texture without crust, and obtained by subjecting the entire mass of dough to the action of electrical energy for the generation of the conversion heat within the dough substantially uniformly and simultaneously throughout the mass thereof.

JOHN KREMER.